(12) United States Patent
Miller et al.

(10) Patent No.: US 6,353,213 B1
(45) Date of Patent: Mar. 5, 2002

(54) VOLTAGE TRANSFORMER TYPE WATER HEATING UNIT

(75) Inventors: Blair Miller, Chicago, IL (US); Thomas J. Mayer, Hoffman Estates, IL (US)

(73) Assignee: BMG Holdings, LLC, Chicago, IL (US)

( * ) Notice: Subject to any disclaimer, the term of this patent is extended or adjusted under 35 U.S.C. 154(b) by 0 days.

(21) Appl. No.: 09/571,651

(22) Filed: May 15, 2000

Related U.S. Application Data

(63) Continuation-in-part of application No. 09/130,947, filed on Aug. 7, 1998, now Pat. No. 6,078,032.

(51) Int. Cl.⁷ .............................. H05B 6/10; H05B 6/42
(52) U.S. Cl. .................. 219/630; 219/632; 219/628; 219/667; 219/677; 99/DIG. 14; 99/302 R
(58) Field of Search .................. 219/628, 629, 219/630, 670, 689, 667, 668, 632, 677; 99/DIG. 14, 451, 279, 306, 302 R

(56) References Cited

U.S. PATENT DOCUMENTS

| | | | | |
|---|---|---|---|---|
| 1,513,087 A | * | 10/1924 | Buhl et al. ................... | 219/630 |
| 3,804,968 A | * | 4/1974 | Mosser ........................ | 219/632 |
| 4,791,262 A | * | 12/1988 | Ando et al. .................. | 219/630 |
| 5,262,621 A | * | 11/1993 | Hu et al. ...................... | 219/628 |
| 5,300,743 A | * | 4/1994 | Park ............................. | 219/689 |
| 5,350,901 A | * | 9/1994 | Inuchi et al. ................ | 219/630 |
| 5,821,507 A | * | 10/1998 | Sasaki et al. ................ | 219/623 |
| 6,078,032 A | * | 6/2000 | Miller et al. ................. | 219/630 |

* cited by examiner

*Primary Examiner*—Philip H. Leung
(74) *Attorney, Agent, or Firm*—Larry L. Saret; Michael Best & Friedrich LLC

(57) ABSTRACT

A water heating unit uses a voltage transformer type heating unit to heat water. The water flows from a water reservoir to a wound transformer where the water passes through metal tubing that is also the secondary winding of the transformer. The secondary winding is shorted and an erect-magnetic field induces a current in the transformer generating heat that heats the water flowing through the metal tubing. The turns of the primary winding of the heating unit can be separated with spacer material and a cooling fan can be included adjacent to the heating unit for forcing air in between the turns of the primary winding to remove excess heat.

11 Claims, 5 Drawing Sheets

VOLTAGE TRANSFORMER TYPE WATER HEATING UNIT

This application is a continuation-in-part of application Ser. No. 09/130,947 filed on Aug. 7, 1998 now U.S. Pat. No. 6,078,032.

FIELD OF THE INVENTION

The present invention relates to water heating units. More particularly, the present invention relates to water heating units which use a voltage transformer type water heating unit to heat water.

BACKGROUND INFORMATION

Generally, hot water beverage makers such as flow-through coffee makers and other water heating units, such as home hot water heaters, consist of a reservoir of water that allows fluid flow to a heating device. Prior art water heating units include electrical resistance coils submerged in or adjacent to the fluid. In another example of a prior art water heating unit, a microwave generator is used to heat water flowing adjacent to the microwave generator. While microwave energy may be more efficient than electrical resistance coils, stray microwave radiation is a danger to people who wear heart pacemakers, and microwave generators are more expensive to construct.

As such, there is a need for an inexpensive water heating unit with an improved water heating unit for heating water.

SUMMARY OF THE INVENTION

These needs and other needs are satisfied by the water heating unit with voltage transformer type water heating unit of the present invention. A first object of the invention is to provide an efficient water heating unit comprised of a voltage transformer type heating unit with a hollow and electrically shorted secondary winding for heating water.

A second object of the invention is to provide a heating unit that may operate at various primary input voltages.

A third object of the invention is to provide a voltage transformer type heating unit that has over temperature protection in the secondary winding.

The water heating unit of the present invention comprises a water supply means, a voltage transformer type water heating unit, a power supply, and a water dispenser. The water flows through tubing from the water supply means to a voltage transformer type heating unit where the water passes through electrically conductive tubing that is also the secondary winding of the transformer. The secondary winding is shorted to form a closed electrical circuit with an in-series electrical safety device.

In one application of the present invention, the water, which is heated when flowing through the secondary winding, can then be passed through a filtering vessel that may contain ground coffee or tea and ultimately into a carafe for serving, or the heated water can be mixed with a powdered beverage mix, such as cocoa, to make the hot beverage. The voltage transformer type heating unit is wound such that relatively high electrical current and low voltage is generated in the secondary winding so as to maximize heating of water flowing through the transformer.

Further objects, features and advantages of the present invention will become apparent from the following description and drawings.

DESCRIPTION OF THE PREFERRED EMBODIMENT

Figure 1:
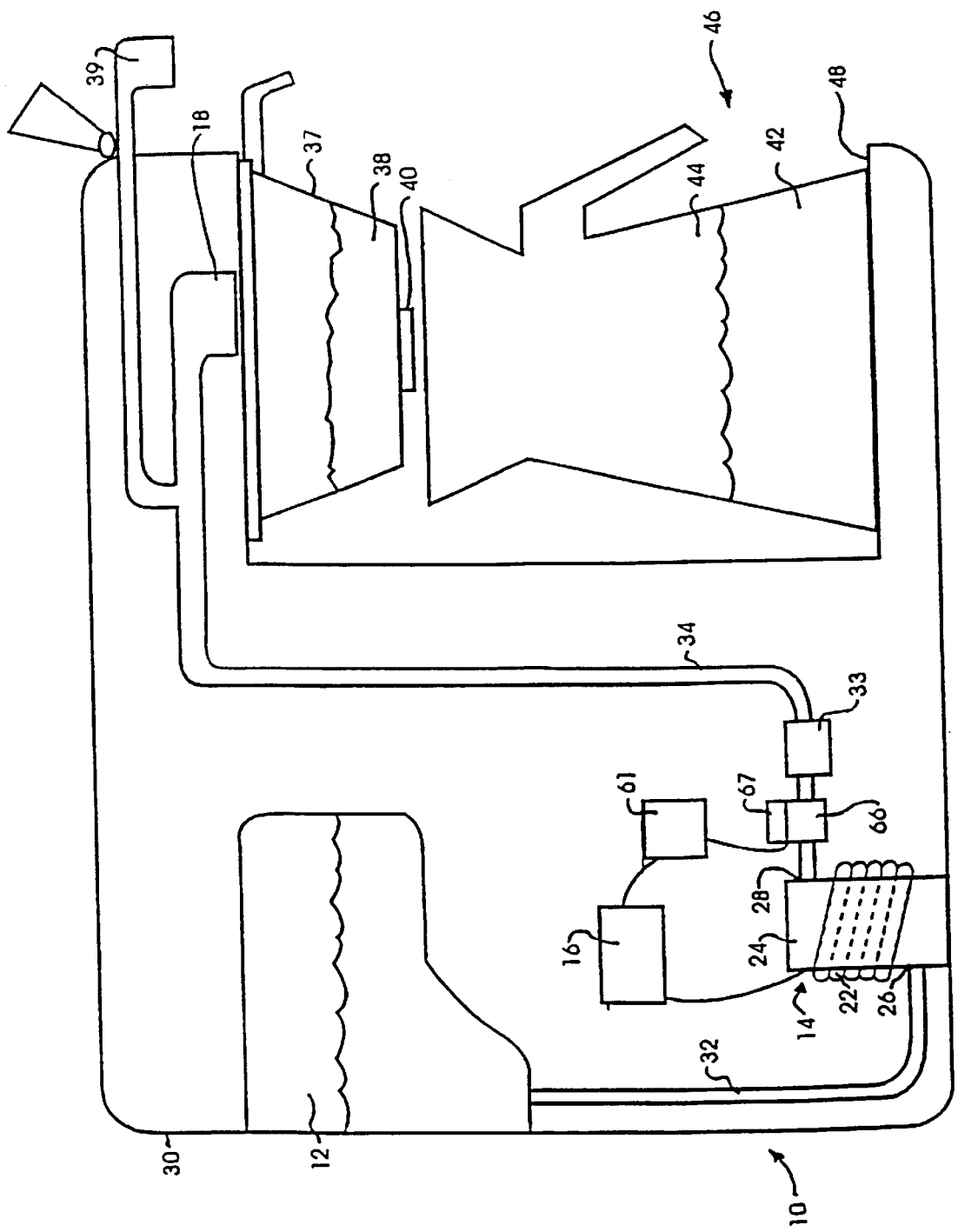
FIG. 1 is a schematic representation of a hot water beverage maker including a water heating unit made in accordance with this invention.

In accordance with the present invention, a water heating unit with voltage transformer type water heating unit is described that provides distinct advantages when compared to those of the prior art. The invention can best be understood with reference to the accompanying drawing figures.

Referring now to the drawings, a hot water beverage maker including a water heating unit according to the invention is generally designated at reference numeral 10. One embodiment of such a hot water beverage maker 10, shown in FIG. 1, comprises a hot coffee maker for brewing hot coffee. Alternative embodiments can be configured to make hot tea, hot water or various other hot beverages.

Figure 2:
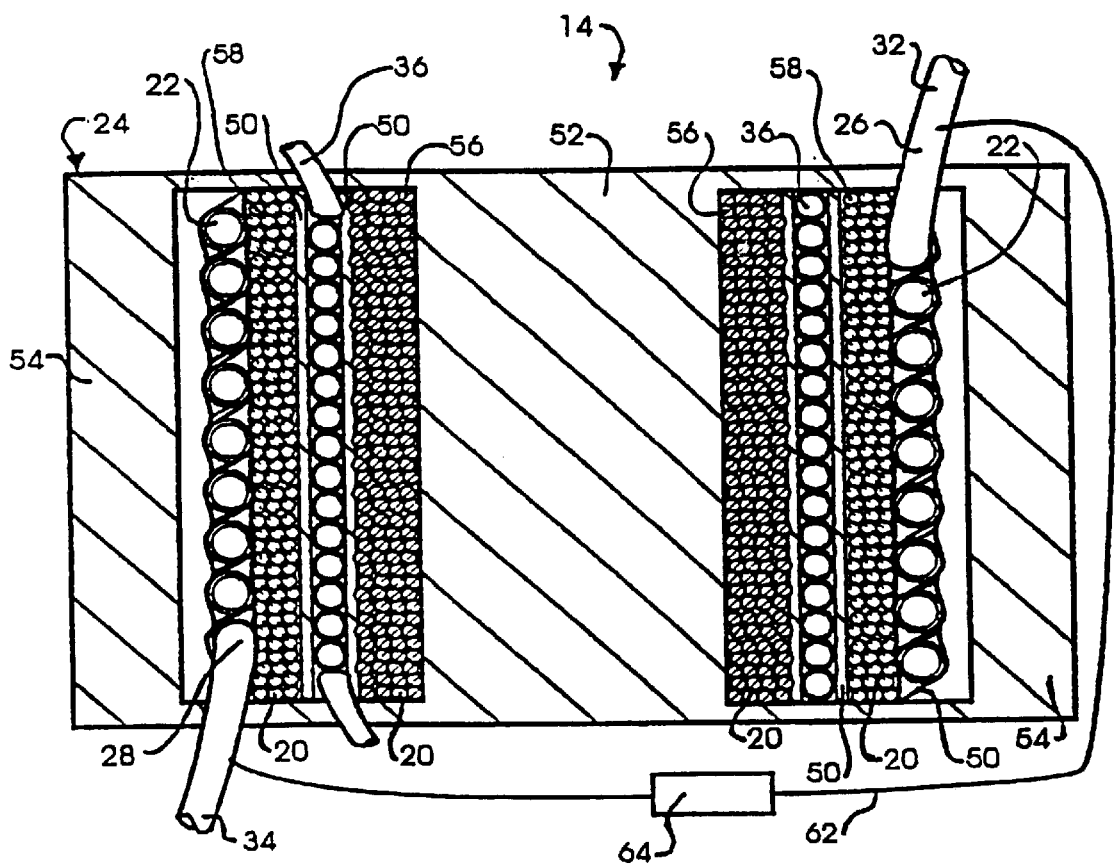
FIG. 2 is a cut away side view of the voltage transformer type heating unit of FIG. 1.

Referring to FIGS. 1 and 2, the hot water beverage maker 10 comprises a water supply means, such as a water reservoir 12, a voltage transformer type heating unit 14, a power supply 16 and a water dispenser 18. The voltage transformer type heating unit 14 comprises a primary winding 20 and a secondary winding 22. Preferably, the voltage transformer type heating unit 14 also includes a coupling core 24. The secondary winding 22 comprises flow through, hollow tubing having a water inlet 26 at one end and a water outlet 28 at the opposite end. The construction of the voltage transformer type heating unit 14 will be more specifically discussed below.

The water reservoir 12 is contained within a coffee maker housing or frame 30. Alternatively, the water supply means may comprise a port for receiving water from an external water source such as a water faucet or other externally piped water source. As shown in FIG. 1, the water reservoir 12 is connected to the secondary winding 22 at the secondary winding water inlet 26 by heating unit tubing 32. Preferably, the heating unit tubing 32 is connected near the bottom of the water reservoir 12 and provides water from the water reservoir 12 to the secondary winding 22.

The secondary winding 22 is hollow to allow water to flow from the water inlet 26 through the secondary winding 22 to the water outlet 28. The secondary winding 22 is comprised of electrically conductive material, preferably copper tubing. The secondary winding 22 heats water flowing through it as described subsequently.

The water outlet 28 of the secondary winding 22 is connected to the water dispenser 18 by filtering vessel tubing 34. Tubing 34 directs water from the secondary winding 22 to the water dispenser 18. Preferably, a check valve 33 is disposed along tubing 34 between the water outlet 28 and the water dispenser 18 to prevent water from flowing back into the secondary winding 22.

Pre-heater/flow control tubing 36 may be connected between the heating unit tubing 32 and the water inlet 26 of the secondary winding 22. The pre-heater/flow control tubing 36 extends between and provides water from the heating unit tubing 32 to the water inlet 26 of the secondary winding 22. In this manner, water is allowed to flow from the water reservoir 12 through the heating unit tubing 32, pre-heater/ flow control tubing 36, secondary winding 22, and filtering vessel tubing 34 to the water dispenser 18.

Preferably, water dispenser 18 comprises a nozzle that directs heated water into the filtering vessel 37. The filtering vessel 37 is removably secured to the housing 30 and is designed to accept a filter (not shown) and ground coffee beans 38. The filtering vessel 37 can also accept tea leaves, etc. for brewing various other hot water beverages. Alternatively, the water dispenser 18 can include a faucet 39 for dispensing hot water. In this manner, a user can dispense hot water that can be mixed with a powered beverage mix, such as cocoa, to produce a hot cocoa.

Hot water dispensed into the filtering vessel 37 is filtered through the ground coffee beans 38, thus producing hot liquid coffee 42. The filtering vessel 37 includes a discharge nozzle 40 aligned to allow the flow of hot liquid coffee 42 from the filtering vessel 37 into a carafe 44. The hot water beverage maker 10 includes a carafe filling and storage location 46 shaped to accept the carafe 44 on a hot plate 48.

As mentioned above, the voltage transformer type heating unit 14 generally comprises a primary winding 20, a secondary winding 22 and a coupling core 24. Preferably, the voltage transformer type heating unit 14 is contained within the inside of the housing 30. The voltage transformer type heating unit 14 is a wound transformer with each subsequent component wound around the next and having insulation 50 between each successive layer.

In a preferred embodiment, the coupling core 24 is comprised of an inner core section 52 and an outer core section 54. The inner core section 52 and outer core section 54 are made of a ferromagnetic material, such as iron. Preferably, the primary winding 20 comprises a first half primary winding section 56 and a second half primary winding section 58. The first half primary winding 56 is wound around the inner core section 52. The second half primary winding section 58 is wound around the first half primary winding section 56. The secondary winding 22 is wound around the second half primary winding section 58 and the outer core section 54 is formed around the secondary winding 22 The pre-heater/flow control tubing 36 is wrapped around the first half primary winding section 56 between the first half primary winding section 56 and the second half primary winding section 58.

Figure 3:
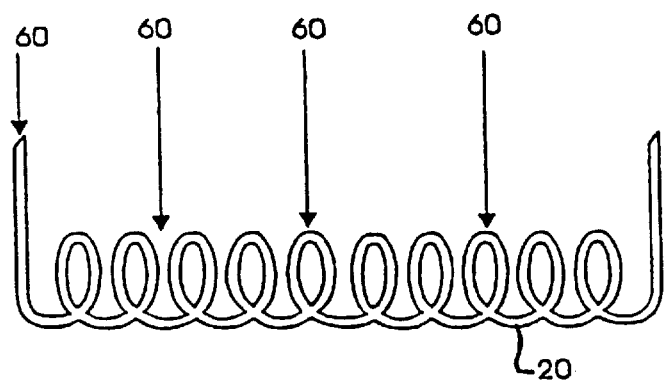
FIG. 3 is a schematic view of the power input to the voltage transformer type heating unit of FIG. 2.

Referring to FIG. 3, the primary winding 20 comprises an electrically conductive wire wound in a predetermined number of turns. The power supply 16 is electrically connected to the primary winding 20. The primary winding 20 has multiple voltage inlet taps 60 for providing electrical power to the primary winding 20. The multiple power taps 60 are configured for receiving different input signals to allow the primary winding 20 to be powered by various alternating and direct current electrical power sources such as 120 VAC, 208 VAC and 220/240 VAC.

A transformer controller 61 shown in FIG. 1, electrically connected to the power supply 16, regulates and controls the current supplied to the primary winding 20 by the power supply 16. In a preferred embodiment, the transformer controller 61 comprises a Triac controller.

The secondary winding 22 is comprised of electrically conductive hollow tubing wound into a predetermined number of turns. In order to make an completed closed electrical circuit, a shorting wire 62 may be connected between the water inlet 26 and water outlet 28 of the secondary winding 22, as shown in FIG. 2. Preferably, the shorting wire 62 includes an in-series mechanical overcurrent electrical safety device 64 such as an electrical fuse interposed between the water inlet 26 and water outlet 28 for preventing damage to the hot water beverage maker 10 due to excessive heat in the secondary winding 22.

Figure 4:
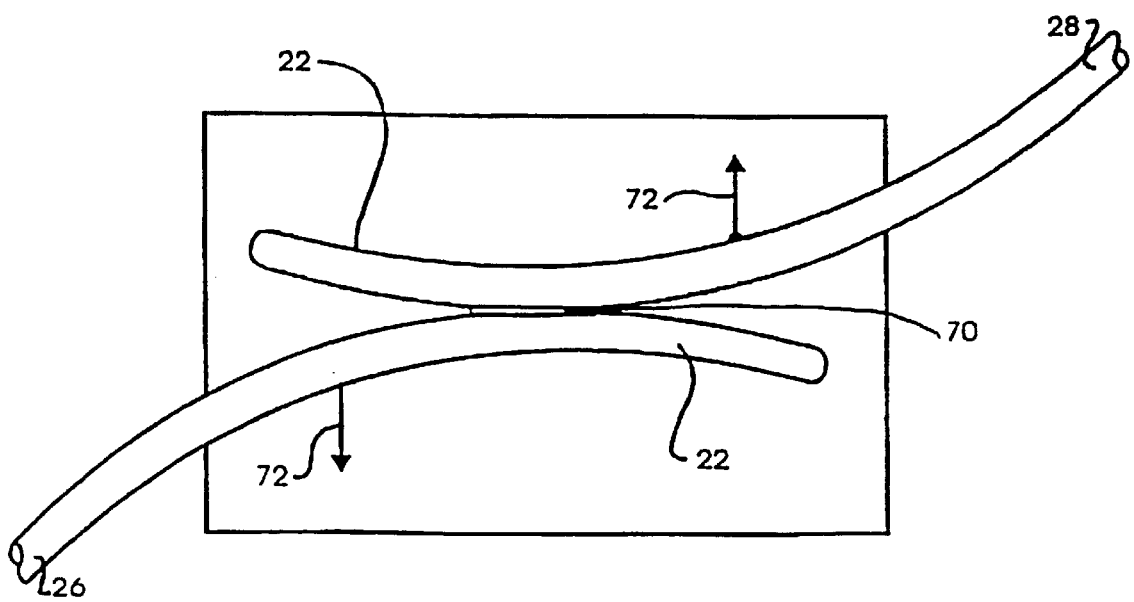
FIG. 4 is an enlarged view of portions of the secondary winding.

Alternatively, as shown in FIG. 4, an electrical closed circuit can be formed with the secondary winding 22 by soldering together the water inlet and outlet end portions 22a and 22b, respectively, of the secondary winding 22 near the water inlet 26 and water outlet 28, using tube connecting solder 70. In this manner, the end portions 22a and 22b overlap along their lengths. Instead of losing the heat that the shorting wire would generate along its length, the connection of the end portions of the secondary winding insures that all heat generated due to resistance losses of current flow through the secondary winding 22 is absorbed by water flowing through the secondary winding 22. In other words, heat generated in the shorting wire 62 described above, which is normally lost, is recovered and absorbed by water in the secondary winding 22.

Preferably, end portions 22a and 22b of the secondary winding 22 tubing are soldered together under tension, as shown by tension lines 72, forming a spring device. A tube connecting solder 70 can be chosen that has melting characteristics such that it will melt at a predetermined temperature. Thus, if the secondary winding 22 exceeds the predetermined temperature, such as when there is excessive current in the secondary winding 22, the tube connecting solder 70 fails and the tension 72 forces the secondary winding 22 to separate at the water inlet 26 and water outlet 28, thereby forming an electrical open circuit. If the secondary winding 22 forms an electrical open circuit, power consumption is reduced to a minimum and the secondary winding 22 is allowed to cool down. In this manner, the tube connecting solder 70 acts in a capacity similar to the above-mentioned in-series mechanical overcurrent electrical safety device 64 to protect the beverage maker 10 from damage due to excessive current or excessive temperature situations.

Figure 5:
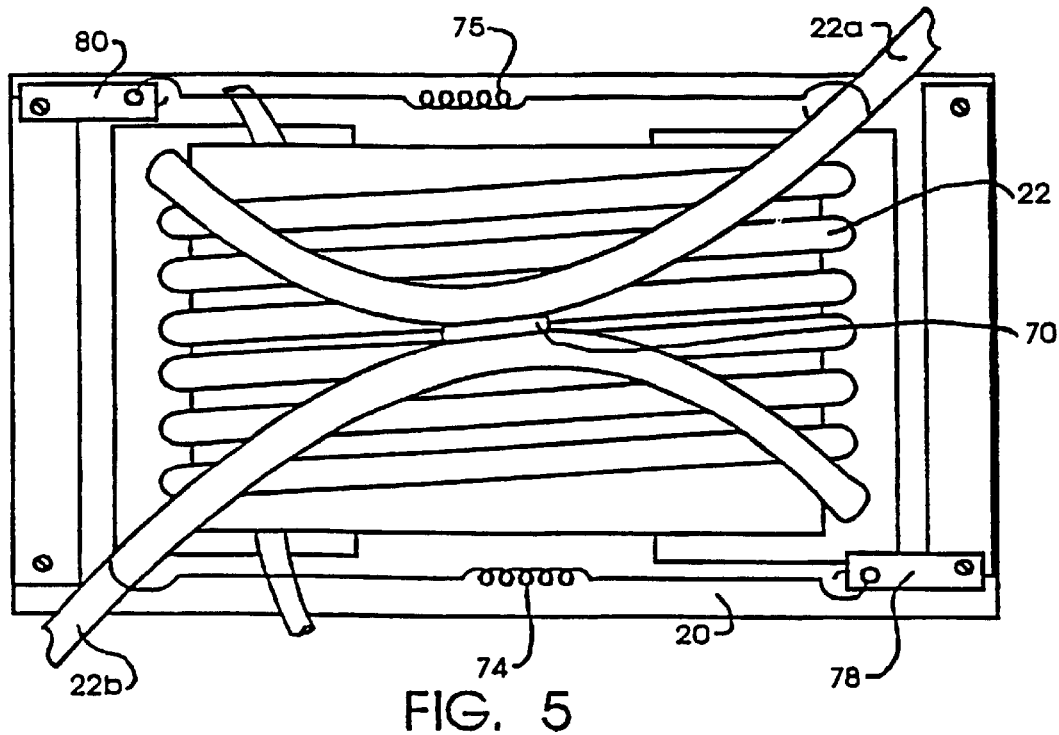
FIG. 5 is an enlarged view of an alternative embodiment of the secondary winding.

As shown in FIG. 5, tension springs 74 and 76 can be connected at one end to the secondary winding 22 near the water inlet end 22b and water outlet end 22b, respectively, and at the other end to the coupling core 20. Preferably, insulated brackets 78 and 80 are used to connect the tension springs 74 and 76 to the coupling core 24. The tension springs 74 and 76 provide tension near the end portions 22a and 22b of the secondary winding 22 to ensure that the end portions 22a and 22b are separated when the tube connecting solder 70 melts.

In operation, when current is supplied to the primary winding 20 by the power supply 16, an electromagnetic field is created around the primary winding 20. The electromagnetic field couples with the secondary winding 22 inducing a current in the secondary winding 22. The shorting wire 62 or tube connecting solder 70 connected between the water inlet 26 and water outlet 28 completes an electrical closed circuit with the secondary winding 22, and electrical resistance in the electrical closed circuit causes the secondary winding 22, including any water in it, to heat up.

The coupling core 24 couples with the primary winding 20 and secondary winding 22. Because the coupling core 24 is composed of ferromagnetic material, there is enhanced coupling between the primary winding 20 and secondary winding 22. The primary winding 20 and secondary winding 22 are wound such that relatively high electrical current and low voltage is generated in the secondary winding 22 so as to maximize heating of the water in the secondary winding 22. This is accomplished by having a lesser number of turns in the secondary winding 22 than in the primary winding 20.

Heated water flows from the secondary winding 22, through the check valve 33 into the filtering vessel tubing 34, and on to the water dispenser 18. Preferably, a temperature sensor 66 (FIG. 1) is disposed between the secondary winding 22 and water dispenser 18 near the water outlet 28. The temperature sensor 66 measures the temperature of the heated water exiting the secondary winding 22.

The temperature sensor 66 is electrically connected to the transformer controller 61. The temperature sensor 66 provides a control signal to the transformer controller 61 indicative of the measured temperature of the heated water. The transformer controller 61 regulates and adjusts the current supplied to the primary winding 20 to maintain a pre-set water temperature range.

The temperature sensor 66 may include a high temperature cutout switch 67 that sends a shutdown signal to the transformer controller 61 if the measured temperature of the heated water exceeds a predetermined maximum temperature. In this situation, the temperature controller 61 shuts off the current supplied to the primary winding 20 by the power supply 16.

As heated water leaves the secondary winding 22 and flows through the check valve 33, water is drawn into the secondary winding 22 from the water reservoir 12 through the heating unit tubing 32 and the pre-heater/flow control tubing 36. Water flowing through the pre-heater/flow control tubing 36 absorbs heat from and thus cools the primary winding 20. Preferably, the pre-heater/flow control tubing 36 comprises non-conducting, thin-walled tubing, such as plastic tubing, so that the tubing does not heat up as current is conducted through the tubing 36. This tubing permits the transformers to more efficiently heat the water.

The partially heated water then flows through the secondary winding 22 where it is further heated by resistance losses of the current flow through the secondary winding 22. The fully heated water exits the secondary winding 22 and flows to the water dispenser 18 via the check valve 33 and filtering vessel tubing 34.

The water dispenser 18 directs water through ground coffee beans 38 held in the filtering vessel 37 creating hot liquid coffee 42. The hot liquid coffee 42 may be collected in a carafe 44 held on a hot plate 48 in the carafe filling and storage location 46.

Figure 6:
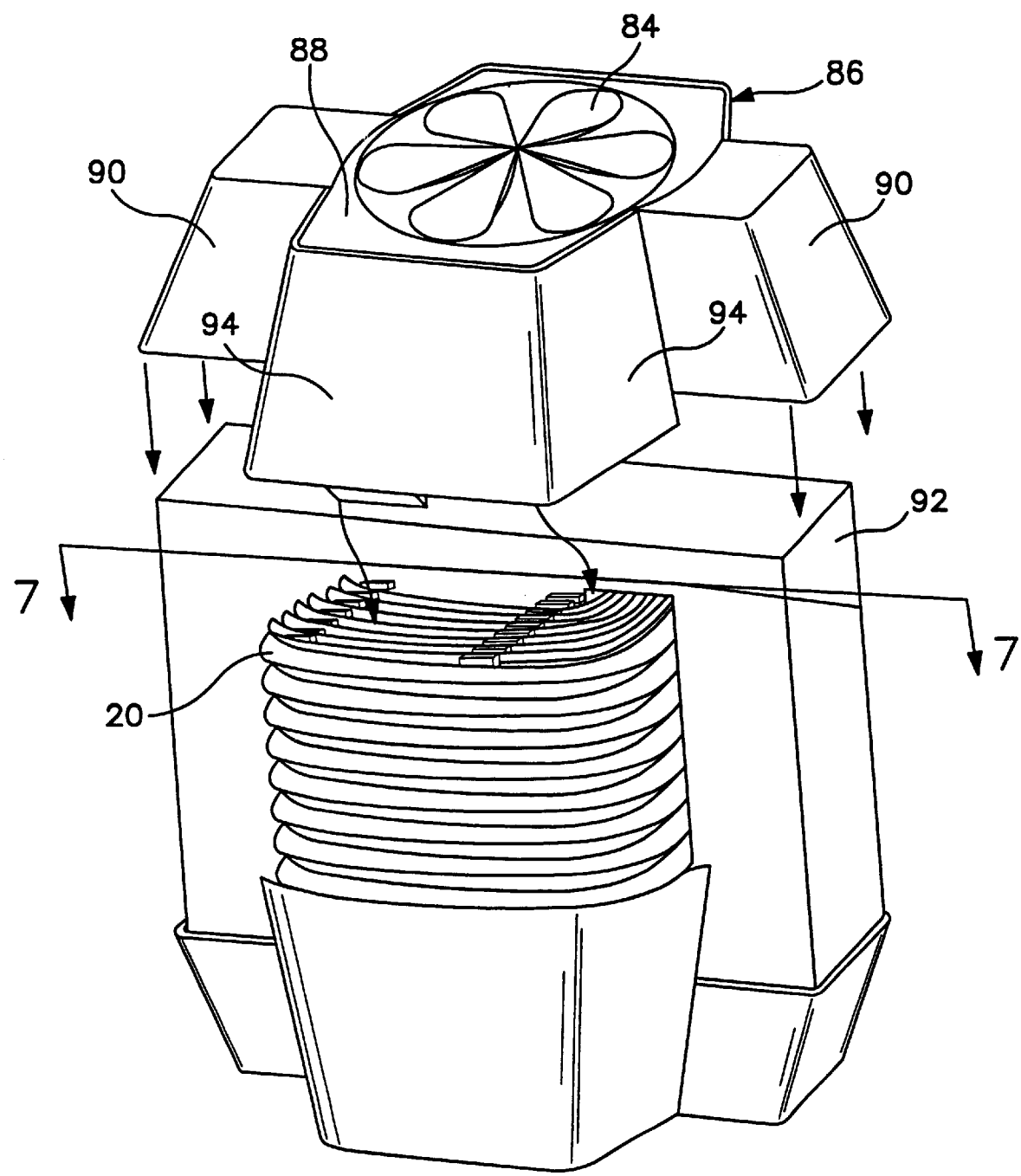
FIG. 6 is an exploded perspective view of an alternative embodiment of a voltage transformer type heating unit according to the present invention.
Figure 7:
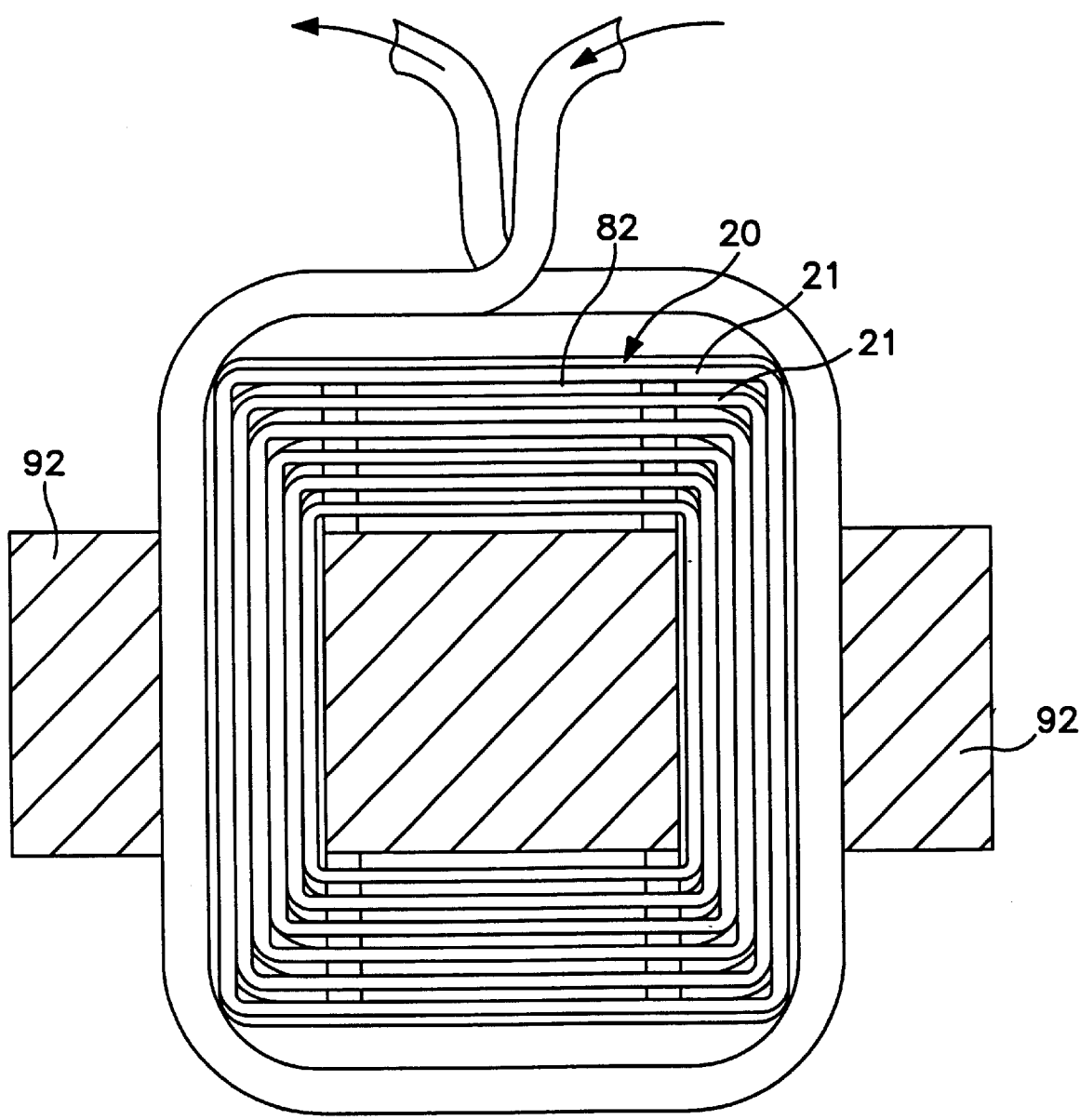
FIG. 7 is a cross-sectional view of the heating unit of FIG. 6.

One alternative embodiment of the water heating unit of the present invention is shown in FIGS. 6 and 7. In this embodiment, the primary windings 20 each include insulating spacer material 82 so as to provide space between each primary winding layer 21 (i.e. each primary winding turn). This space allows for substantial amounts of air to pass between each primary winding layer 21, thus removing excess heat and preventing overheating.

The spacer material is preferably glastic sticks, which separate and insulate the layers of primary windings from one another. The sticks of spacer material are also spaced apart from each other, such as near the corners of the rectangular shaped heating unit of FIG. 7. In this manner, most of the surface area of the primary windings is exposed to air which, as described above, prevents overheating of the unit.

In addition to natural air flow (convection) through the spaces between the primary winding layers 21, a cooling fan 84, shown in FIG. 6, can also be added to further increase air flow. The cooling fan 84 is positioned adjacent to the primary winding 20 for forcing larger amounts of air through the spaces between the primary winding layers 21.

To increase the efficiency of the cooling fan 84, a shroud or housing 86 surrounds the fan 84 to direct the air flow generated by the cooling fan 84 into the spaces between the primary winding layers 21. The shroud 86 comprises a central chamber 88 in which the cooling fan 84 is located and outer wings 90 for connecting the shroud 86 to a heating unit housing 92 which surrounds the heating unit 14. Preferably, the central chamber 88 walls 94 are angled to direct air flow generated by the cooling fan 84 into the spaces between the primary winding layers 21.

It will be apparent to those skilled in the art that modifications may be made without departing from the spirit and scope of the invention. Accordingly, it is not intended that the invention be limited except as may be necessary in view of the appended claims.

What is claimed is:

1. A hot beverage water heating unit comprising:
    water supply means for supplying water to be heated;
    a voltage type transformer heating unit connected to said water supply means, said transformer heating unit for heating said water;
    a power supply for supplying electrical current to said transformer heating unit; and
    a water dispenser connected to said transformer heating unit for dispensing said heated water;
    said transformer heating unit comprising a primary winding having a predetermined number of turns and a secondary winding having a predetermined number of turns, said secondary winding being electrically conductive and hollow such that said water is allowed to flow from said water supply means through said secondary winding to said water dispenser, wherein current is supplied to said primary winding of said transformer heating element by said power supply, creating an electro-magnetic field around said primary winding that couples with said secondary winding, thereby inducing a current in said secondary winding and heating said secondary winding and said water flowing through said secondary winding;
    insulating spacer material between each of said turns of said primary winding to provide space between each said primary winding turn so that air can pass between each said primary winding turn for removing excess heat; and
    a cooling fan positioned adjacent to said primary winding for increasing air flow through said space between each said primary winding turn.

2. The hot beverage water heating unit of claim 1 wherein said transformer heating unit further comprises a coupling core of ferromagnetic material electro-magnetically coupled to said primary winding and heating said secondary winding.

3. The hot beverage water heating unit of claim 1 wherein said secondary winding includes a water inlet operably connected to said water supply means and a water outlet operably connected to said water dispenser, said water heating unit comprising a shorting wire electrically connected between said water inlet and said water outlet, forming a closed electrical circuit with said secondary winding.

4. The hot beverage water heating unit of claim 1 further comprising a transformer controller operably connected to said power supply for controlling the amount of electrical current supplied to said primary winding.

5. The hot beverage water heating unit of claim 4 further comprising a temperature sensor operably connected between said secondary winding and said water dispenser and electrically connected to said transformer controller, said temperature sensor for measuring the temperature of said heated water and providing said measured temperature to said transformer controller, wherein said transformer controller adjusts the amount of electrical current supplied to said primary winding to control the temperature of said heated water.

6. The hot beverage water heating unit of claim 5 wherein said temperature sensor includes a high temperature cutout switch that sends a shutdown signal to said transformer controller when said measured temperature exceeds a predetermined temperature and said transformer controller shuts off the current supplied to said primary winding upon receiving said shutdown signal.

7. The hot beverage water heating unit of claim 1 wherein said secondary winding has a lesser number of turns than said primary winding, thus generating a high current in said secondary winding relative to said current supplied to said primary winding by said power supply.

8. The hot beverage water heating unit of claim 1 wherein said secondary winding includes a water inlet connected to said water supply means and a water outlet connected to said water dispenser, wherein a length of said secondary winding near said water inlet is secured to a length of said secondary winding near said water outlet, forming a closed electrical circuit.

9. The hot beverage water heating unit of claim 1 wherein said primary winding includes a plurality of voltage inlet taps, whereby each of said plurality of voltage inlet taps receives a different electrical input signal.

10. The hot beverage water heating unit of claim 1 further comprising a shroud for holding said cooling fan and directing said increased air flow through said space between each said primary winding turn.

11. The hot beverage water heating unit of claim 10 wherein said shroud comprises a central chamber having angled walls for directing said increased air flow.

\* \* \* \* \*